United States Patent
Inagaki et al.

(10) Patent No.: US 12,447,613 B2
(45) Date of Patent: Oct. 21, 2025

(54) ROBOT CONTROL DEVICE AND ROBOT SYSTEM

(71) Applicant: FANUC CORPORATION, Yamanashi (JP)

(72) Inventors: Satoshi Inagaki, Yamanashi (JP); Hajime Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 217 days.

(21) Appl. No.: 18/248,466

(22) PCT Filed: Dec. 14, 2021

(86) PCT No.: PCT/JP2021/046108
§ 371 (c)(1),
(2) Date: Apr. 10, 2023

(87) PCT Pub. No.: WO2022/138337
PCT Pub. Date: Jun. 30, 2022

(65) Prior Publication Data
US 2023/0364789 A1    Nov. 16, 2023

(30) Foreign Application Priority Data
Dec. 21, 2020    (JP) .................................. 2020-211689

(51) Int. Cl.
*B25J 9/16*    (2006.01)
*B23K 11/11*    (2006.01)
*B25J 11/00*    (2006.01)

(52) U.S. Cl.
CPC ........... *B25J 9/1661* (2013.01); *B23K 11/115* (2013.01); *B25J 11/005* (2013.01)

(58) Field of Classification Search
CPC ........ B25J 9/1661; B25J 11/005; B25J 9/163; B25J 9/1641; B23K 11/115; G05B 2219/39186; G05B 2219/39195
See application file for complete search history.

(56) References Cited

U.S. PATENT DOCUMENTS 10,856,945 B2 *    12/2020    Hashimoto ............ B25J 9/1628
11,897,146 B2 *    2/2024    Tsuchiya ................ B25J 9/1674
(Continued)

FOREIGN PATENT DOCUMENTS

EP    3643453 A1    4/2020
JP    2014-014897 A    1/2014
(Continued)

OTHER PUBLICATIONS

International Search Report issued in PCT/JP2021/046108; mailed Feb. 15, 2022.

*Primary Examiner* — Jason Holloway
*Assistant Examiner* — Madison B Emmett
(74) *Attorney, Agent, or Firm* — Studebaker Brackett PLLC

(57) ABSTRACT

Provided is a robot control device capable of reducing a robot vibration amount using machine learning based on a small number of operations. A robot control device according to one aspect of the present invention that, in order to perform a task in relation to a target object which is made to move by a robot, controls operation by the robot based on an operation program that uses a plurality of pass-through points to specify a movement path that includes one or more task sections in which the task is to be performed, the robot control device including: a command value generation unit configured to, based on the operation program, generates a command value that instructs a state of the robot for each time; a driving unit configured to drive the robot in accordance with the command value; a vibration amount obtain- (Continued)

ment unit configured to, for each time, obtain an amount of vibration of the robot that is driven by the driving unit; a vibration amount extraction unit configured to, based on the operation program, extract the amount of vibration for a time corresponding to the task section from among the amounts of vibration obtained by the vibration amount obtainment unit; and a command value correction unit configured to, based on the amount of vibration extracted by the vibration amount extraction unit, correct the command value.

5 Claims, 5 Drawing Sheets

(56) References Cited

U.S. PATENT DOCUMENTS

| | | | | |
|---|---|---|---|---|
| 2002/0062177 | A1* | 5/2002 | Hannaford | G06F 3/016 |
| | | | | 700/245 |
| 2014/0039678 | A1* | 2/2014 | Motoyoshi | B25J 9/1641 |
| | | | | 700/258 |
| 2014/0156070 | A1* | 6/2014 | Merry | B25J 9/1653 |
| | | | | 700/253 |
| 2018/0257227 | A1* | 9/2018 | Washizu | B25J 9/1697 |
| 2019/0376575 | A1* | 12/2019 | Cloud | F16F 7/104 |
| 2020/0238512 | A1* | 7/2020 | Furuta | B25J 9/1664 |
| 2020/0262059 | A1* | 8/2020 | Wilkas | B25J 9/042 |
| 2021/0046654 | A1* | 2/2021 | Knott | B25J 11/0055 |
| 2021/0260757 | A1* | 8/2021 | Nielsen | B25J 9/163 |

FOREIGN PATENT DOCUMENTS

| | | |
|---|---|---|
| JP | 2019-147197 A | 9/2019 |
| JP | 2020-179484 A | 11/2020 |
| TW | 201945141 A | 12/2019 |

* cited by examiner

ROBOT CONTROL DEVICE AND ROBOT SYSTEM

TECHNICAL FIELD

The present invention pertains to a robot control device and a robot system.

BACKGROUND ART

Systems have been widely used such as robot welding systems, for example, in which a reference point that represents the position of a conveyed object such as a workpiece or a tool held by a tip end of a robot is made to move along a predefined track to thereby perform a desired operation. In such a robot system, the robot is made to operate such that, in accordance with an operation program that represents the desired track by a plurality of pass through points, the tip end of the robot passes through the plurality of pass-through points in order.

Since the robot has elasticity, albeit slight, in the mechanical structure thereof, vibration is produced in conjunction with operation by the robot. When the operation by the robot is sped up to thereby improve work efficiency, the vibration of the robot increases. Accordingly, it has been proposed to measure actual vibration for when a robot is operating and, using machine learning based on this measurement value, correct amounts of time for acceleration/deceleration by the robot such that it is possible to suppress vibration of the robot (for example, refer to Patent Document 1).

Patent Document 1: Japanese Unexamined Patent Application, Publication No. 2019-147197

DISCLOSURE OF THE INVENTION

Problems to be Solved by the Invention

In order to sufficiently suppress vibration by a robot using machine learning, it is necessary to repeat a step for causing the robot to operate and for confirming the vibration that actually occurs, and a step for correcting a command value in such a manner as to cancel the confirmed vibration. In a case of executing various operation programs in the same robot system, such as a case in which a robot is used in a manufacturing line for manufacturing a wide variety of products in small quantities, for example, it is necessary to repeat operation for the purpose of machine learning for each operation program. The number of repetitions for machine learning necessary in order to have vibration fall within an allowed range increases with greater operating speed of the robot. Accordingly, in a case where a required number of times executing an operation program is low, a decrease in time due to increasing the operating speed of the robot is unfortunately offset by the time required for the machine learning.

In light of the actual circumstances, an object of the present invention is to provide a robot control device and robot system capable of using machine learning based on a small number of operations to reduce vibration of a robot.

Means for Solving the Problems

A robot control device according to one aspect of the present invention is a robot control device that, in order to perform a task in relation to a target object which is made to move by a robot, controls operation by the robot based on an operation program that uses a plurality of pass-through points to specify a movement path that includes one or more task sections in which the task is to be performed. The robot control device includes: a command value generation unit that, based on the operation program, generates a command value that instructs a state of the robot for each time; a driving unit that drives the robot in accordance with the command value; a vibration amount obtainment unit configured to, for each time, obtain an amount of vibration of the robot that is driven by the driving unit; a vibration amount extraction unit that, based on the operation program, extracts the amount of vibration for a time corresponding to the task section from among the amounts of vibration obtained by the vibration amount obtainment unit; and a command value correction unit that, based on the amount of vibration extracted by the vibration amount extraction unit, corrects the command value.

Effects of the Invention

By virtue of the present invention, it is possible to provide a robot system capable reducing vibration in accordance with machine learning based on a small number of operations.

PREFERRED MODE FOR CARRYING OUT THE INVENTION

Figure 1:
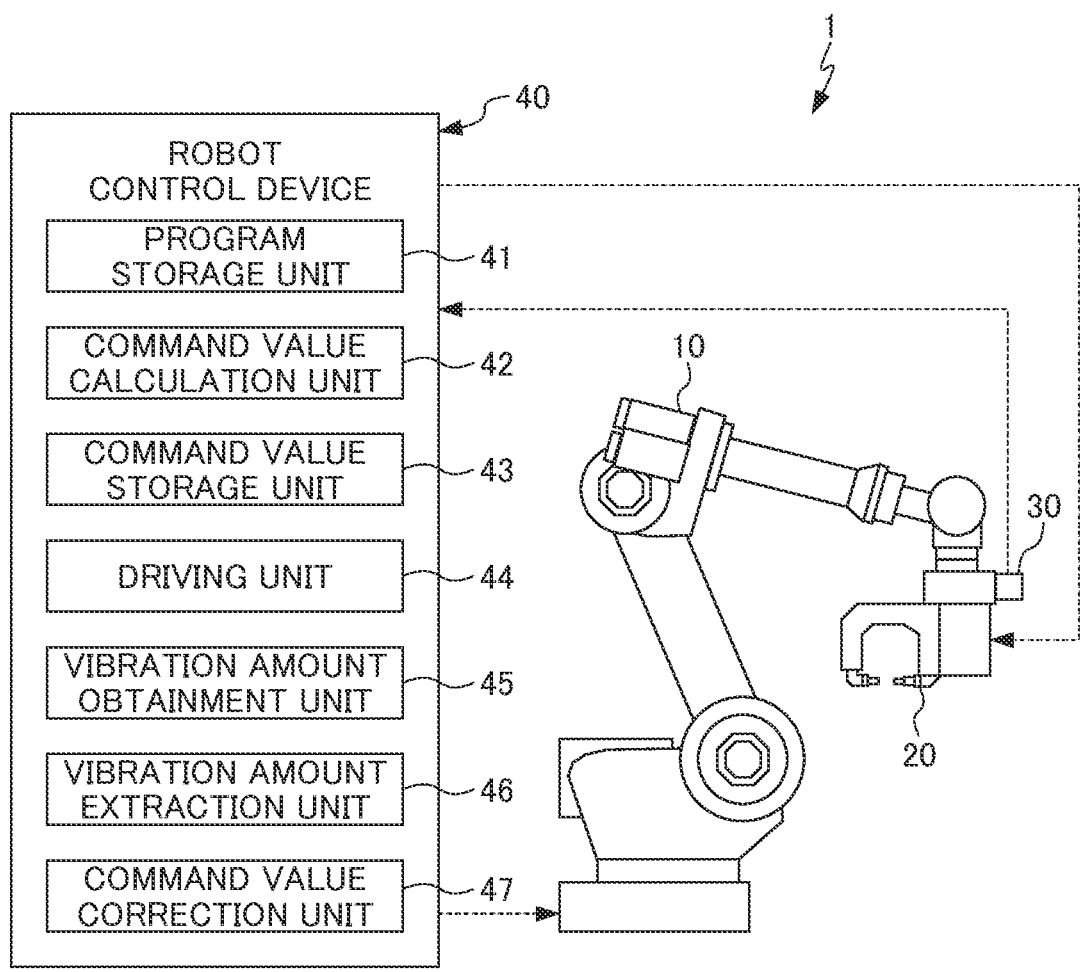
FIG. 1 is a schematic view that illustrates the configuration of a robot system according to one embodiment of the present invention.

Hereinafter, embodiments of the present invention will be described while referencing the drawings. FIG. 1 is a schematic view that illustrates a configuration of a robot system 1 according to one embodiment of the present invention.

The robot system 1 according to the present embodiment is provided with a robot 10; a target object 20 held by a tip end of the robot 10 and made to move by the robot 10, a vibration detector 30 that detects a value pertaining to an amount of vibration (deviation between a theoretical position and an actual position for a tip end) for the robot 10, and a robot control device 40 that controls the robot 10.

Typically, a vertical articulated robot such as that illustrated is used as the robot 10. In the following description, the robot 10 is described as a vertical articulated robot, but the robot 10 may be, inter alia, a scalar robot, a parallel-link robot, or a Cartesian coordinate robot, for example.

The robot 10 includes a plurality of links connected by joints, and defines an angular position for a drive shaft for each joint in accordance with a command value inputted from the robot control device 40, whereby a target object 20 is positioned in a world coordinate system (normally a coordinate system for a space in which the base section of the robot 10 is fixed). Drive mechanisms for the links and joints in the robot 10 can elastically deform slightly, and can cause vibration to occur in conjunction with operation by the robot 10. Vibration of the robot 10 generates an amount of vibration in the target object 20.

It is envisioned that the target object 20 is, inter alia, a device that performs various operations such as machining or measuring, or a workpiece that is to be subjected to an operation, for example, and may be a holder that holds these. As an example, the target object 20 illustrated in FIG. 1 is a welding head that performs spot welding by pinching a workpiece and applying welding current thereto.

The vibration detector 30 detects a value that can be used for calculating an amount of vibration, such as acceleration or a position in the world coordinate system for the tip end of the robot 10 or the target object 20. In the illustrated example, the vibration detector 30 is secured to the tip end of the robot 10 such that the vibration detector 30 does not move relative to the target object 20; however, the vibration detector 30 may be immovably installed in the world coordinate system.

In order to perform a task in relation to the target object 20 which is made to move by the robot 10, the robot control device 40 controls operation by the robot 10 based on an operation program that uses a plurality of pass-through points to specify a movement path that includes one or more task sections which are for performing the task. Specifically, the robot control device 40 supplies drive current to each drive shaft in the robot 10 in order to cause the robot 10 to operate in accordance with the operation program.

For example, the robot control device 40 can be realized by causing one or more computer apparatuses having, inter alia, memory, a CPU, and an input/output interface to execute an appropriate control program. It should be note that each component in the robot control device 40 described below is categorized by the function thereof, and does not need to be a component that can be clearly classified in a physical configuration and program structure.

The robot control device 40 is provided with a program storage unit 41, a command value generation unit 42, a command value storage unit 43, a driving unit 44, a vibration amount obtainment unit 45, a vibration amount extraction unit 46, and a command value correction unit 47.

Figure 2:
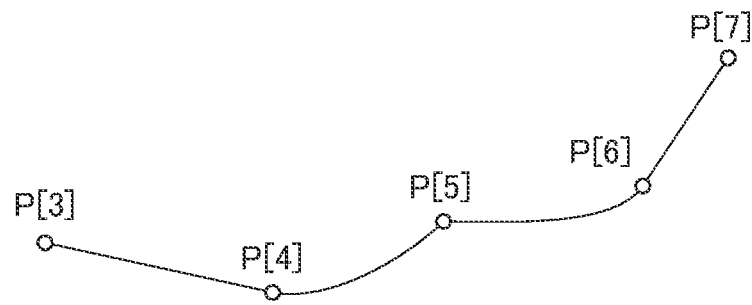
FIG. 2 is a schematic view that illustrates a movement path for a target object in a case of performing spot welding using the robot system in FIG. 1.

The program storage unit 41 stores an operation program. In the robot system 1, for example, an operation program for performing spot welding on a movement path as illustrated in FIG. 2 can be written as follows.

Spot Welding Program Example

1: EACH AXIS @POSITION[1]100% POSITIONING
2:
3: EACH AXIS @POSITION[2] 100% SMOOTH 50
4: STRAIGHT LINE @POSITION[3] 3000 mm/sec POSITIONING
5:
6: LEARNING START [1] ACHIEVEMENT DEGREE 0% SPOT
7: STRAIGHT LINE @POSITION[4] 2000 mm/sec SMOOTH 100
: SPOT [S=1]
8:
9: STRAIGHT LINE @POSITION[5] 2000 mm/sec SMOOTH 100
: SPOT [S=1]
10:
11: STRAIGHT LINE @POSITION[6] 2000 mm/sec SMOOTH 100
: SPOT [S=1]
12: LEARNING END
13:
14: STRAIGHT LINE @POSITION[7] 100 mm/sec SMOOTH 100
15: EACH AXIS @POSITION[1] 100% POSITIONING
[END]

Similar to conventionally, the exemplified operation program includes command text designating pass-through points for the robot 10, and command text indicating a start point and an end point for learning. It is possible to write a command that instructs execution of a task relating co the target object 20 in command text that designates a pass-through point for the robot 10. In the exemplified operation program, "POSITION[n]" indicates the nth pass-through point defined in a table that separately defines pass-through points. A start point and an end point for a task section for actually performing a task in relation to a target object can be respectively identified by a pass-through point. Note that, for the purpose of simplification, "POSITION[n]" is illustrated as "p[n]" in the drawings.

The robot control device 40 according to the present embodiment configured such that it is possible to write various task types in command text indicating a start point for learning. Using a written task type, it is distinguished whether being a task performed at a single pass-through point as with spot welding or being a task started at one pass-through point and ended at another pass-through point as with laser processing, for example. In the exemplified operation program, "SPOT" at the end of command text indicating the start point for learning on the sixth line is a switch indicating that task content is spot welding and a task section is only one pass-through point, i.e., the start point and end point for the task section are the same. In this operation program, "SPOT [S=1]" in lines 7, 9, and 11 indicates that spot welding should be performed at a pass-through point which can be expressed on that line.

Figure 3:
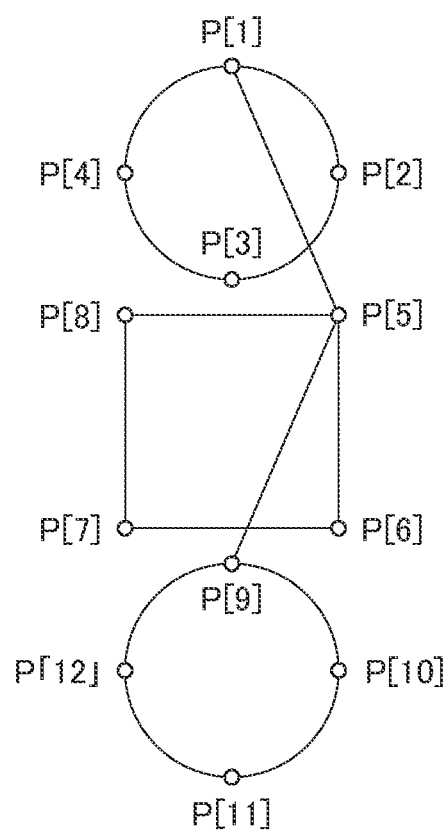
FIG. 3 is a schematic view that illustrates a movement path for a target object in a case of performing laser welding using the robot system in FIG. 1.

Next, an operation program is exemplified in a case where lie target object 20 is a laser head for forming a linear groove by continuously irradiating a laser onto a workpiece, and laser processing is performed in a movement path as illustrated in FIG. 3, for example.

Laser Processing Program Example

1: EACH AXIS POSITION[1] 100% POSITIONING
2:
3: LEARNING START [1] ACHIEVEMENT DEGREE 0% LASER PROCESSING
4: DO[1]=ON
5: CIRCULAR ARC POSITION[2] POSITION[3] 400 mm/s SMOOTH 100
6: CIRCULAR ARC POSITION[3] POSITION[4] 400 mm/s SMOOTH 100
7: CIRCULAR ARC POSITION[4] POSITION[1] 400 mm/s POSITIONING
8: DO[1]=OFF
9:
10: STRAIGHT LINE POSITION[5] 2000 mm/sec POSITIONING
11: DO[1]=ON 12: STRAIGHT LINE POSITION[6] 400 mm/sec CR0
13: STRAIGHT LINE POSITION[7] 400 mm/sec CR0
14: STRAIGHT LINE POSITION[8] 400 mm/sec CR0
15: STRAIGHT LINE POSITION[5] 400 mm/sec CR0
16: DO[1]=OFF
17:
18: STRAIGHT LINE POSITION[9] 2000 mm/sec POSITIONING
19: DO[1]=ON
20: CIRCULAR ARC POSITION[10] POSITION[11] 400 mm/s SMOOTH 100
21: CIRCULAR ARC POSITION[11] POSITION[12] 400 mm/s SMOOTH 100
22: CIRCULAR ARC POSITION[12] POSITION[9] 400 mm/s POSITIONING
23: DO[1]=OFF
24: LEARNING END
[END]

In the exemplified operation program, "LASER PROCESSING" at the end of the command text indicating the start point for learning in the third line is a switch indicating that the task content is laser processing, the task section starts at a pass-through point for which a command is written indicating a start point for laser irradiation, and ends at a pass-through point for which a command is written indicating an end point for laser irradiation. In the above operation program, "DO[1]=ON" in lines 4, 11, and 19 is a command for instructing the start of laser irradiation at a pass-through point written in the next line, and "DO[1] OFF" in lines 8, 16, and 23 is a command for instructing the end of laser irradiation at a pass-through point written in the previous line.

Based on an operation program, the command value generation unit 42 generates a command value for instructing a state for each time of the robot 10. Specifically, positions which should be assumed by the respective drive shafts in the robot 10 for each time are calculated in a case of causing the target object 20 to move along a route written in the operation program.

The command value storage unit 43 stores a command value that is calculated by the command value generation unit 42. A command value stored in the command value storage unit 43 can be updated by the command value correction unit 47.

The driving unit 44 drives the robot 10 in accordance with a command value stored in the command value storage unit 43. Specifically, in order for respective drive shafts in the robot 10 to achieve the angular positions designated by a command value, rotation speeds of the drive shafts and drive currents required therefor are calculated, and the calculated drive currents are supplied to the respective shafts in the robot 10.

Based on a detection value from the vibration detector 30, the vibration amount obtainment unit 45 obtains an amount of vibration for each time in the robot 10 driven by the driving unit 44. Specifically, in a case where the vibration detector 30 detects the position of the tip end of the robot 10 or the target object 20 in a world coordinate system, the vibration amount obtainment unit 45 can be configured to calculate an amount of vibration from the difference between a detection value of the vibration detector 30 and a position calculated from a command value from the robot control device 40. In addition, in a case where the vibration detector 30 detects the acceleration of the tip end of the robot 10 or the target object 20, the vibration amount obtainment unit 45 may be configured to calculate an amount of vibration from the difference between a detection value of the vibration detector 30 and an acceleration calculated from a command value of the robot control device 40.

Based on an operation program, the vibration amount extraction unit 46 extracts an amount of vibration for a time corresponding to a task section, from among the amounts of vibration obtained by the vibration amount obtainment unit 45. Here, a "time corresponding to a task section" is preferably set to a time belonging to a predetermined set range in which the overall range of the task section and the end point of the task section both match the start point of the task section, in other words, a time belonging to a set range immediately prior to the task section. The "set range" is a range estimated to greatly influence vibration of the robot 10 at the start point of the task section, and is defined based on a predetermined rule that is set in advance. Specifically, the set range can be set, as appropriate, in response to estimated vibration of the robot 10, such as to a fixed time range, a fixed movement distance range, or a time range proportional to a movement speed, for example. It should be noted that the set range may be set to "zero", i.e., set in order to cause a range for extracting an amount of vibration to match a task section.

Figure 4:
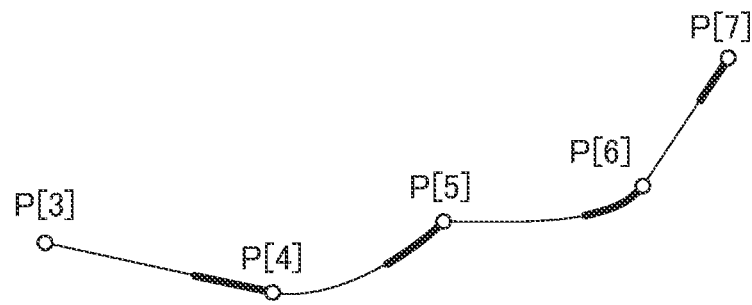
FIG. 4 is a schematic view that illustrates ranges in which amounts of vibration are extracted, for the movement path in FIG. 2.
Figure 5:
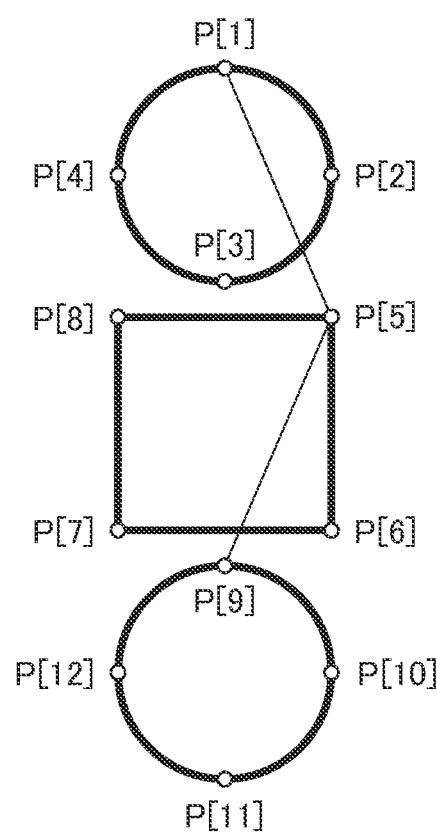
FIG. 5 is a schematic view that illustrates ranges in which amounts of vibration are extracted, for the movement path in FIG. 3.

FIG. 4 illustrates, by thick lines, ranges in which amounts of vibration are extracted for the movement, path in FIG. 2, and FIG. 5 illustrates, by thick lines, ranges in which amounts of vibration are extracted for the movement path in FIG. 3. In this manner, the vibration amount extraction unit 46 only extracts amounts of vibration for a task section of performing a task with respect to the target object 20 and a set range immediately prior thereto, and ignores amounts of vibration for sections in which a task is not performed, excluding set ranges that are immediately prior to task sections.

An operation program is typically created in order to restrict the speed and acceleration of the target object 20 in order to accurately perform work in relation to the target object 20 in a task section; however, in order to shorten cycle time during a task section, an operation program is created without restricting speed and acceleration. When following such an operation program, an amount of vibration due to elastic deformation by the robot 10 is likely to increase, with the acceleration of the robot 10 reaching a maximum immediately after starting movement from the end point for a task section toward the start point for a subsequent task section.

The command value correction unit 47 uses machine learning based on the amount of vibration extracted by the vibration amount extraction unit 46 to correct a command value such that the amount of vibration by the robot 10 decreases. The command value correction unit 47 treats an amount of vibration for a time at which extraction was not performed by the vibration amount extraction unit 46 as zero. In other words, the command value correction unit 47 corrects a command value in order to decrease only an amount of vibration that can influence the accuracy of a task relating to the target object 20, for a task section and set range that is immediately prior thereto. In contrast, the command value correction unit 47 does not perform compensation for an amount of vibration in a range in which there is no influence on accuracy for a task relating to the target object 20 immediately after starting movement from the end point of a task section to the start point of the subsequent task section and in which an amount of vibration is likely to become large. It should be noted that correction of a command value using machine learning based on an amount of vibration can be performed using a publicly known method.

When compensation is performed for vibration while acceleration by the robot 10 is high, it is possible for overshoot to occur and an amount of vibration to increase when acceleration by the robot 10 has decreased. The command value correction unit 47 can allow vibration while such acceleration by the robot 10 is high, and thus it is possible to prevent an increase in the amount of vibration due to overshoot in compensation for an amount of vibration within a task section from arising. It should be noted that, while moving the target object 20 from a task section to the subsequent task section and not performing a task, even if deviation arises between the actual position of the robot 10 and a position planned by an operation program, there is no influence on a result of the task.

Figure 6:
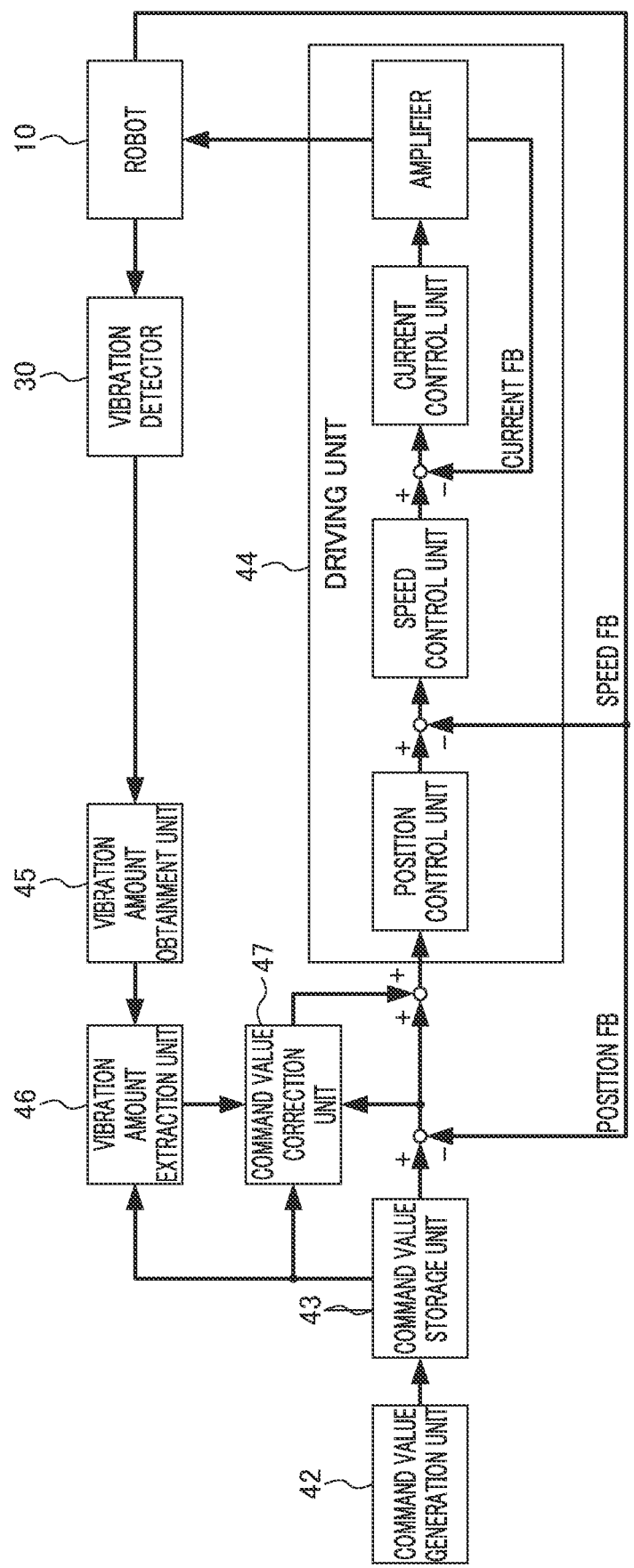
FIG. 6 is a control block diagram that illustrates a flow for command value, correction in the robot system of FIG. 1.

FIG. 6 is a control block view that illustrates the flow of command value correction in the robot system 1. In this manner, after some detection values from the vibration detector 30 are masked by the vibration amount extraction unit 46, command values are corrected by the command value correction unit 47, whereby it is possible to use machine learning based on a small number of operations to effectively, reduce vibration of the robot 10 in a task section.

Figure 7:
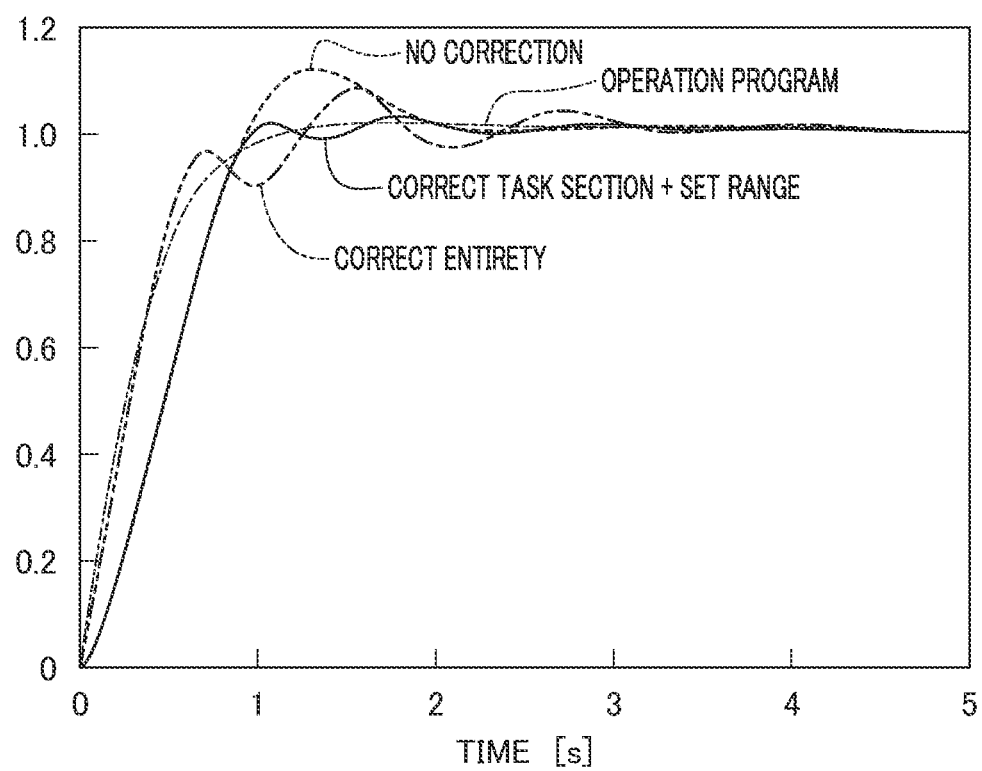
FIG. 7 is a graph that illustrates change for positions of a target object in the robot system of FIG. 1.

FIG. 7 graphically illustrates an example of changes over time for the position of the target object 20 in spot welding using the robot system 1. The figure illustrates position change due to uncorrected command values in accordance with an operation program, position change due to command values that have been corrected to reduce vibration for all sections in accordance with performing an operation three times, and position change due to command values that have been corrected to reduce vibration for only task sections and set sections in accordance with performing an operation three times. In this example, a time for a task section (a pass-through point for performing spot welding) is 1.5 seconds, and a time for the start point of a set range is 0.7 seconds.

As illustrated, command values are corrected after using the vibration amount extraction unit 46 to extract amounts of vibration for only task sections and set sections, whereby it is possible to significantly suppress vibration at a time when spot welding is performed.

Although a description has been provided above regarding an embodiment for a robot system according to the present disclosure, the scope for the present disclosure is not to be limited to the embodiment described above. In addition, the effects set forth in the embodiment described above merely list the most preferred effects that arise from the robot system according to the present disclosure. The effects from the robot system according to the present disclosure are not limited to those set forth in the embodiment described above.

EXPLANATION OF REFERENCE NUMERALS

1 Robot system
10 Robot
20 Target object
30 Vibration detector
40 Robot control device
41 Program storage unit
42 Command value generation unit
43 Command value storage unit
44 Driving unit
45 Vibration amount obtainment unit
46 Vibration amount extraction unit
47 Command value correction unit

The invention claimed is:

1. A robot control device that, in order to perform a task in relation to a target object which is made to move by a robot, controls operation by the robot based on an operation program that uses a plurality of pass-through points to specify a movement path that includes one or more task sections in which the task is to be performed, the robot control device comprising:
a processor configured to function as:
a command value generation unit configured to, based on the operation program, generates a command value that instructs a state of the robot for each time;
a driving unit configured to drive the robot in accordance with the command value;
a vibration amount obtainment unit configured to obtain an amount of vibration of the robot that is driven by the driving unit;
a vibration amount extraction unit configured to, based on the operation program, extract an amount of vibration for a time at which the driving unit drives the robot to perform the task in the one or more task sections from among the amounts of vibration obtained by the vibration amount obtainment unit and ignore an amount of vibration for a time at which the driving unit drives the robot along the movement path outside the one or more task sections; and
a command value correction unit configured to, based on the amount of vibration extracted by the vibration amount extraction unit, correct the command value.

2. The robot control device according to claim 1, wherein a start point and an end point of the task section are each specified by any of the pass-through points.

3. The robot control device according to claim 1, wherein a start point and an end point of the task section are specified by a command that is written in the operation program and that instructs execution of the task.

4. The robot control device according to claim 1, wherein the vibration amount extraction unit extracts the amount of vibration for a time belonging to a predetermined set range in which an overall range of the task section and an end point of the task section both match a start point of the task section.

5. A robot system, comprising:
a robot control device according to claim 1;
a robot controlled by the robot control device; and
a vibration detector configured to detect a value pertaining to an amount of vibration of the robot.

* * * * *